Oct. 6, 1931.     B. F. BLAKE     1,826,500
FLOWER TRAY
Filed Nov. 18, 1930
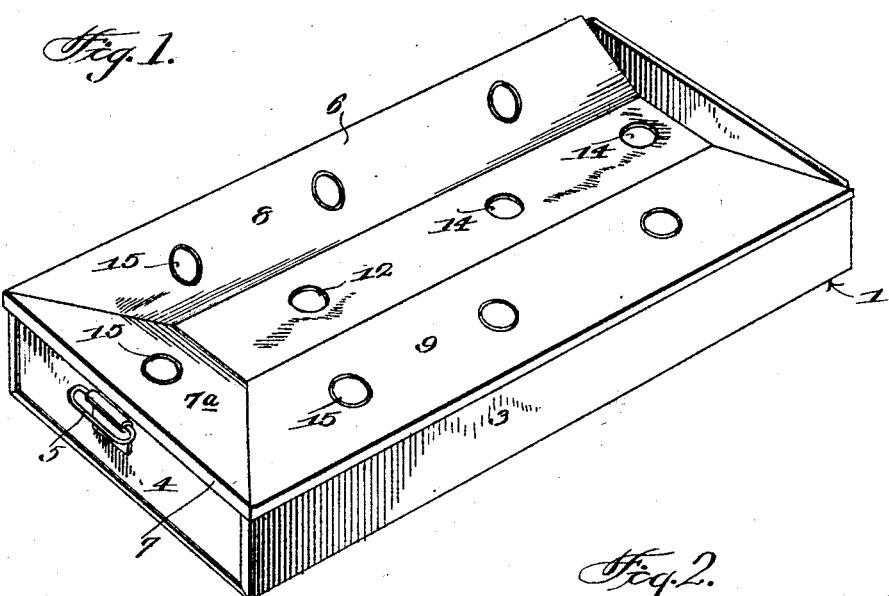
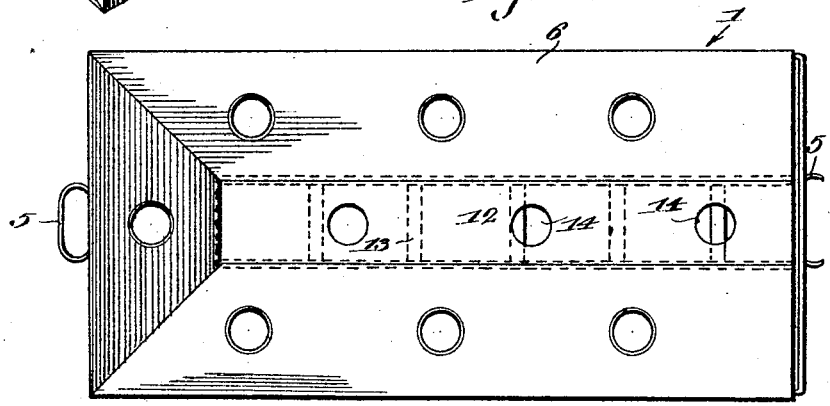
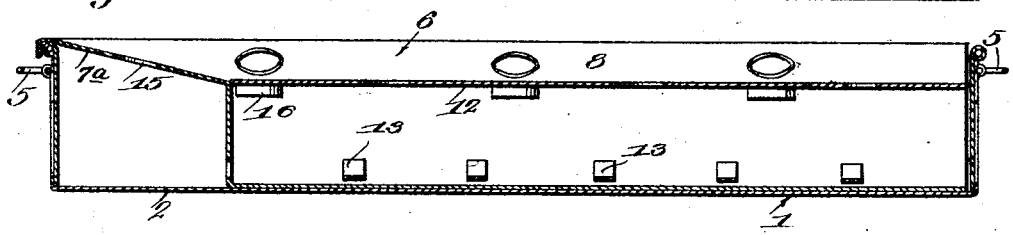
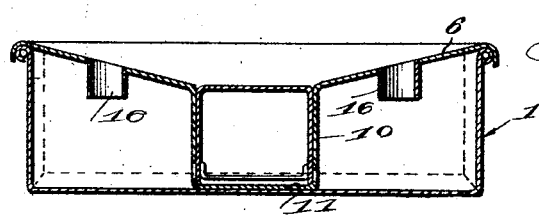
INVENTOR
B.F.Blake, DECEASED.
Ethel E. Blake, ADMINISTRATRIX.
BY
ATTORNEY Patented Oct. 6, 1931

1,826,500

UNITED STATES PATENT OFFICE

BENJAMIN F. BLAKE, DECEASED, LATE OF MARION, OHIO, BY ETHEL E. BLAKE, ADMINISTRATRIX, OF MARION, OHIO

FLOWER TRAY

Application filed November 18, 1930. Serial No. 496,548.

This invention relates to flower trays for use by florists and others.

A primary object of the invention is to construct a tray which may be used for holding bouquets and sprays of flowers after they are made up and until they are ready for use, or to be delivered.

Another object is to so construct a device of this character that it may be used to preserve either large or small bouquets and the size of which may be varied to accommodate bouquets of different lengths.

Another object is to so construct a tray of this character that the flowers and leaves will be kept out of the water while the stems of the flowers will be submerged and thus keep the flowers in perfect condition until time to deliver.

Another object is to so construct a tray of this character that small bouquets or individual flowers may be kept fresh with their stems submerged without in any way injuring or cutting the stem incident to the insertion of the flower through openings in the tray.

In carrying out these objects, the invention is susceptible of a wide range of modification without departing from the spirit of sacrificing any of the advantages of the claimed invention; there being shown in the drawings for illustrative purposes a preferred and practical form, in which:

Figure 1 represents a perspective view of a tray constructed in accordance with this invention shown ready for use;

Fig. 2 is a top plan view thereof showing the removable central member in position;

Fig. 3 is a longitudinal central section; and

Fig. 4 is a transverse vertical section.

In the embodiment illustrated the tray constituting this invention is shown rectangular in form and comprises a rectangular body member 1 composed of any suitable material preferably of metal and having the usual bottom 2 with upstanding sides and ends 3 and 4. The ends of this body member are provided with foldable handles 5 for manipulating and transporting the tray.

Mounted on the body member 1 is a removable longitudinally slidable cover or lid 6 having downturned flanges 7 along its side edges and one end as shown clearly in Fig. 1 which are designed to fit over the beaded edges of the body of the tray and to slide back and forth thereon for a purpose presently to be described.

This lid 6 has a downwardly inclined sloping portion 7a at one end and similar portions 8 and 9 at the sides which portions merge into a depending trough 10. The bottom 11 of this trough is designed to rest on the bottom 2 of the tray body 1. This trough 10 as shown is built lengthwise in the center of the lid. This trough is designed to contain water so that the stems of the flowers which are tied together in forming casket bouquets or sprays and produce a roll under the bouquet may be immersed in the water with the blossoms and leaves of the flowers supported by the slanting sides and end of the lid and thus the sprays may be kept in perfect condition until time to deliver them. This is a great help to florists, permitting them to make up these sprays some time in advance of their delivery which is not now true.

Should the tray be a little short for the sprays the lid 6 can be slid longitudinally toward the end having the sloped portion until the end of the trough contacts the end of the tray body. This lengthens the size of the flower support considerably and permits longer sprays to be supported thereby with the stems in the water.

The lid 6 is provided with a plurality of apertures in the sloping sides and end thereof as shown clearly in the drawings and any desired number of these apertures may be provided and they may be of any desired size. These apertures which are numbered 15 are designed to receive corsage bouquets or bunches of flowers to be kept fresh when the tray is not used for larger sprays. These apertures or holes are preferably about an inch and one-half in diameter and have depending from the lower face of the lid sleeves or tubes 16. These tubes are designed to operate as supports for the stems of the bouquets to hold them in upright position and to prevent the edges of the apertures from cutting the stems. These tubes may be of any desired length, being preferably long enough so that the ends thereof will be submerged in the water so that ample moisture will be supplied to the flowers.

Removably mounted in the trough 10 is a flower supporting member or filler 12 shaped to fit in the trough with the top thereof flush with the edges of the sloping sides and end as shown clearly in Figs. 1 and 2 of the drawings. This supporting member 12 fits within the trough 10 and is also preferably made of metal with an open bottom provided with transversely extending longitudinally spaced strips 13 which are designed to be used when the device 12 is reversed to support bouquets larger than will fit within the apertures 15 formed in the top thereof. By using this member 12 in the trough 10 a larger number of small bouquets may be taken care of and by reversing the member 12 and placing the metal strip side up larger bunches of flowers may be supported in this device.

The hole 15 in the end portion 7a of the lid is the only one which does not have a depending sleeve and this is due to the fact that it is not desired to have such sleeve operate as a stop for the lid when it is moved rearwardly as above described.

It will thus be seen that this tray is made of three parts only whereby a tray is produced which is cheap to manufacture, yet strong and durable and which is capable of keeping fresh made up bouquets of various sizes.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

What is claimed is:

1. A tray for supporting and keeping cut flowers fresh which comprises a water containing body member having a lid mounted thereon and provided with downwardly sloping portions equipped with apertures for the passage of the flower stems.

2. A tray for supporting and keeping cut flowers fresh which comprises a water containing body member having a lid mounted thereon and provided with downwardly sloping portions equipped with apertures for the passage of the flower stems, said sloping portions merging into a depending longitudinally extending trough.

3. A tray for supporting and keeping cut flowers fresh which comprises a water containing body member having a lid mounted thereon and provided with downwardly sloping portions equipped with apertures for the passage of the flowers stems, said sloping portions merging into a depending longitudinally extending trough, said trough being of a depth to have its bottom rest on the bottom of the tray body.

4. A tray for supporting and keeping cut flowers fresh which comprises a water containing body member having a led mounted thereon and provided with downwardly sloping portions equipped with apertures for the passage of the flower stems, said sloping portions merging into a depending longitudinally extending trough, and a removable filler mounted in said trough and provided with a plurality of openings to support flowers therein.

5. A tray for supporting and keeping cut flowers fresh which comprises a water containing body member having a lid mounted thereon and provided with downwardly sloping portions equipped with apertures for the passage of the flower stems, said sloping portions merging into a depending longitudinally extending trough, and a removable filler mounted in said trough and provided with a plurality of openings to support flowers therein, said filler being reversible and provided on one face with transversely extending strips to form compartments for flowers to be supported.

6. A tray for supporting and keeping cut flowers fresh which comprises a water containing body member having a lid mounted thereon and provided with downwardly sloping portions equipped with apertures for the passage of the flower stems, said apertures being provided on the lower face of the lid with depending tubes to receive flowers and hold them in upright position.

ETHEL E. BLAKE,
*Administratrix of the Estate of Benjamin F. Blake, Deceased.*